(12) United States Patent  (10) Patent No.: US 8,961,110 B2
Johansen  (45) Date of Patent: Feb. 24, 2015

(54) FILTERING OF DEBRIS IN WIND TURBINES

(75) Inventor: Brian Johansen, Ejby (DK)

(73) Assignee: Vestas Wind Systems A/S, Aarhus N (DK)

(*) Notice: Subject to any disclaimer, the term of this patent is extended or adjusted under 35 U.S.C. 154(b) by 870 days.

(21) Appl. No.: 13/060,977

(22) PCT Filed: Aug. 26, 2009

(86) PCT No.: PCT/DK2009/000189
§ 371 (c)(1),
(2), (4) Date: Jun. 7, 2011

(87) PCT Pub. No.: WO2010/022724
PCT Pub. Date: Mar. 4, 2010

(65) Prior Publication Data
US 2011/0241352 A1  Oct. 6, 2011

Related U.S. Application Data

(60) Provisional application No. 61/092,438, filed on Aug. 28, 2008.

(30) Foreign Application Priority Data

Aug. 28, 2008 (DK) .................................. 2008 01185

(51) Int. Cl.
*F03D 11/00* (2006.01)
*B03C 3/017* (2006.01)
(Continued)

(52) U.S. Cl.
CPC .............. *F03D 11/00* (2013.01); *B03C 3/017* (2013.01); *B03C 3/383* (2013.01); *H02K 9/26* (2013.01); *H02K 7/1838* (2013.01); *H02K 9/28* (2013.01);
(Continued)

(58) Field of Classification Search
CPC ... F03D 11/00; F03D 11/0016; F03D 11/005; B03C 3/017
USPC ..................... 415/121.2, 169.1, 232
See application file for complete search history.

(56) References Cited

U.S. PATENT DOCUMENTS 4,503,673 A * 3/1985 Schachle et al. ................. 60/398
6,469,414 B2 * 10/2002 Rehder et al. .................. 310/232
(Continued)

FOREIGN PATENT DOCUMENTS

EP  1 669 596  6/2006
EP  1 837 519  9/2007
(Continued)

OTHER PUBLICATIONS

Translation of WO2008086839A2 provided by Espacenet.*
(Continued)

*Primary Examiner* — Dwayne J White
*Assistant Examiner* — Justin Seabe
(74) *Attorney, Agent, or Firm* — Patterson & Sheridan LLP

(57) ABSTRACT

A wind turbine is disclosed, the wind turbine comprising a nacelle including at least one of a debris-generating device, an inlet for air or an outlet for air. Following this invention, the wind turbine further comprises at least one electro-static filter arranged to filter at least one of the debris coming from the debris-generating device, the air coming into the nacelle through the inlet or the air coming out of the nacelle through the outlet.

11 Claims, 5 Drawing Sheets

(51) Int. Cl.
*B03C 3/38* (2006.01)
*H02K 9/26* (2006.01)
*H02K 7/18* (2006.01)
*H02K 9/28* (2006.01)

(52) U.S. Cl.
CPC .............. *Y02E 10/722* (2013.01); *Y02E 10/725* (2013.01); *Y02E 10/726* (2013.01)
USPC .................................... 415/121.2; 415/169.1

(56) References Cited

U.S. PATENT DOCUMENTS

| | | | | |
|---|---|---|---|---|
| 6,483,199 | B2* | 11/2002 | Umemoto et al. | 290/55 |
| 6,676,122 | B1* | 1/2004 | Wobben | 290/55 |
| 7,339,302 | B2* | 3/2008 | Lewis et al. | 310/232 |
| 2006/0264070 | A1* | 11/2006 | Day et al. | 439/13 |
| 2007/0222223 | A1* | 9/2007 | Bagepalli et al. | 290/55 |
| 2010/0118492 | A1* | 5/2010 | Larsen | 361/696 |

FOREIGN PATENT DOCUMENTS

| | | |
|---|---|---|
| EP | 2 034 181 | 3/2009 |
| WO | 93/16807 | 9/1993 |
| WO | WO 2008086839 A2 * | 7/2008 |

OTHER PUBLICATIONS

NPL "AirCommaner—The Enforcer" provided by the internet archive; URL: http://web.archive.org/web/20070321082835/http://www.acfilter.com/.*

European Patent Office, Office Action communication received in corresponding EP Application No. 09776186.0-2311 dated Nov. 28, 2012, 3 pages.

Pierluigi Pileri; International Search Report issued in priority International Application No. PCT/DK2009/000189; Jul. 20, 2010; 3 pages; European Patent Office.

* cited by examiner

FILTERING OF DEBRIS IN WIND TURBINES

BACKGROUND

1. Field of the Disclosure

The present invention relates to a slip-ring system configured for use in for a wind turbine, a wind turbine having a nacelle housing including an electro-static filter and a method for filtering debris from an airstream in a nacelle.

2. Technical Background

Some moving parts in a nacelle have a tendency to produce debris during operation. One of these components is the slip-ring system. When operating a slip-ring system an amount of debris is generated. The debris could be metallic airborne particles. In some embodiments the particles may be silver-graphite, cobber or any other electrically conductive material. The particles may built-up on other components in the nacelle, which potentially lead to failure or at least increased need for maintenance. Therefore there is a need to reduce the amount of debris inside the nacelle. Also it could be an advantage to reduce the amount of debris in exhaust air from a nacelle.

Further, it may be desirable to reduce the amounts of particles that enter a wind turbine. For example, U.S. Pat. No. 6,439,832 discloses a device for prohibiting the penetration of corrosively acting salt particles into a generator and gear area of a wind power plant, the device comprising notably an air pressure generator and filtering means coupled along an air flow channel, wherein this filtering means is a turbulence chamber.

SUMMARY OF THE DETAILED DESCRIPTION

According to a first aspect of the present invention, a slip-ring system is provided. The slip-ring system is configured for use in a wind turbine. The slip-ring system comprises:
  an outlet,
  a debris-generating part, the debris-generating part generating a first amount of debris during operation, the first amount of debris being expelled using a fluid stream flowing through the outlet, and
  an electro-static filtering part mounted in fluid communication with the outlet of the debris-generating part via the outlet, the electro-static filtering device configured to filter debris from the fluid stream, the electro-static filtering part configured to filter the fluid stream to obtain second amount of debris being lower than the first amount of debris.

This is contemplated to reduce the amount of debris from an airflow flowing from or at least past the slip-ring system.

The second amount of debris may be less than 10% of the first amount of debris.

According to a second aspect of the present invention, a wind turbine comprising a nacelle is provided. The nacelle includes at least one of a debris-generating device, an inlet for air or an outlet for air, the wind turbine further comprising at least one electro-static filter arranged to filter at least one of the debris coming from the generating device, the air coming into the nacelle through the inlet or the air coming out of the nacelle through the outlet.

Providing one or more electro-static filters or electro-static filtering devices in a wind turbine advantageously enables filtering of:
  the debris coming from inside the nacelle of the wind turbine to prevent the debris from polluting the nacelle and/or the outside (external environment);
  some external particles from outside the nacelle that may cause damage to the equipment contained in the nacelle (this is contemplated to allow filtering of the air taken into the nacelle interior and thereby providing air with a low amount of foreign/external particles), which will prolong the service life of the wind turbine.

These advantages can be found in combination depending on the combination of the different uses of the electro-static filter following the second aspect of the invention.

Further, the wind turbine may include:
  a debris-generating device mounted in the nacelle housing, the debris-generating device generating a first amount of debris during operation, the debris-generating device comprising an outlet, and
  an electro-static filtering device configured to receive a fluid stream originating from the outlet of the debris-generating device, the electro-static filtering device further being configured to filter the received fluid stream to obtain a second amount of debris being lower than the first amount of debris.

In the wind turbine according to this embodiment, the electro-static filter provides an advantageous reduction in the amount of debris inside the nacelle, which is contemplated to reduce the need for service and repair.

The outlet of the electro-static filtering device may be mounted in fluid communication with the outlet of the nacelle, e.g. by piping forming a closed fluid connection between the outlet of the electrostatic filtering device and the outlet of the nacelle.

A fluid path or fluid connection may be established from the outlet of the debris-generating device to the inlet of the filtering device, e.g. by pipes or tubes optionally with connectors forming a fluid connection between the outlet of the debris-generating device and the inlet of the filtering device. A fluid path or fluid connection may be established from the outlet of the filtering device to the outlet of the nacelle housing, e.g. by pipes or tubes optionally with connectors forming a fluid connection. A fluid connection may be a closed fluid connection.

The debris-generating device or part may be a slip ring assembly comprising a slip ring device enclosed by a closed housing having and inlet and/or an outlet.

The debris-generating device may further comprise an inlet. A closed-loop fluid connection path may be established from the outlet of the debris-generating device via the filtering device to the inlet of the debris-generating device. Accordingly, a fluid connection may be established from the outlet of the filtering device to an inlet of the debris-generating device, e.g. by pipes or tubes optionally with connectors forming a fluid connection.

The debris may comprise a silver-graphite mixture, and may originate from moving parts in the debris-generating device.

A second filtering device may be mounted at an inlet of the nacelle housing.

A flow generating device, e.g. a pump or fan, may be used for establishing flow of fluid.

According to a fourth aspect of the present invention a method of reducing particles with at least one electro-static filter comprised in a nacelle of a wind turbine is provided. The method comprises at least one of the following steps or any combination of them (therefore using as many electro-static filters as needed):
  a debris-generating device comprised in the nacelle housing being provided, establishing a fluid flow past the debris-generating device thereby providing debris in the fluid stream at a first rate, and filtering the fluid stream with the electro-static filter, the electro-static filter reducing the amount of particles from the debris in the fluid stream to a second rate being substantially lower than the first rate;

filtering an air stream coming from the outside of the nacelle with an electro-static filter, the electro-static filter reducing the amount of particles in the incoming air to a substantially lower density than the density of particles in the outside air;

filtering an air stream coming from the inside of the nacelle with the electro-static filter, the electro-static filter reducing the amount of particles in the out coming air from the nacelle to a substantially lower density than the density of particles in the air inside the nacelle of the wind turbine.

The method according to the fourth aspect is contemplated to allow an advantageous reduction:

of particles from debris drawn into the space inside the nacelle of the wind turbine, of particles (like salty particles coming from the sea in offshore turbines) coming in from the outside of the nacelle and that could be damaging fro the equipment present in the inside of the nacelle, or/and of particles from debris coming out of the nacelle.

Advantages of the method and wind turbine include but are not limited to:

reduced need for repairs and service and prolongation of the lifetime of the wind turbine, reduced wear on the equipment when the wind turbine is located in an aggressive environment, and/or reduced pollution created by the wind turbine.

The method according to the fourth aspect of the present invention may be modified or supplemented to perform steps relating to any of the features mentioned in relation to the first, second and/or third aspects of the present invention.

BRIEF DESCRIPTION OF THE FIGURES

The present invention will be discussed in more detail with reference to the appended drawings in which.

DETAILED DESCRIPTION

Generally, a wind turbine with substantial horizontal axis comprises a tower, a nacelle rotatably mounted to the tower with a yaw system on top of the tower, and a rotor comprising blades that are movable by the wind. A shaft and optionally a gear box transmit the movement of the rotor of the wind turbine to the rotor of an electrical generator that transforms the mechanical energy of the rotor into electrical power.

Generally when a generator in a wind turbine is operated, the slip ring system mounted on the generator will wear the brushes and slip rings. Any debris from the brushes and slip rings may advantageously be removed, or at least greatly reduced, from the air surrounding the slip ring housing. This is contemplated to provide the advantage of no, or at least very small amounts of, metal/carbon debris being exhausted into the environment. The debris released may be silver-graphite.

It is contemplated that reducing or removing debris inside the nacelle of a wind turbine will further reduce need for repairs caused by deposits of airborne particles originating from a debris-generating device, such as a slip-ring system or the like.

Figure 1:
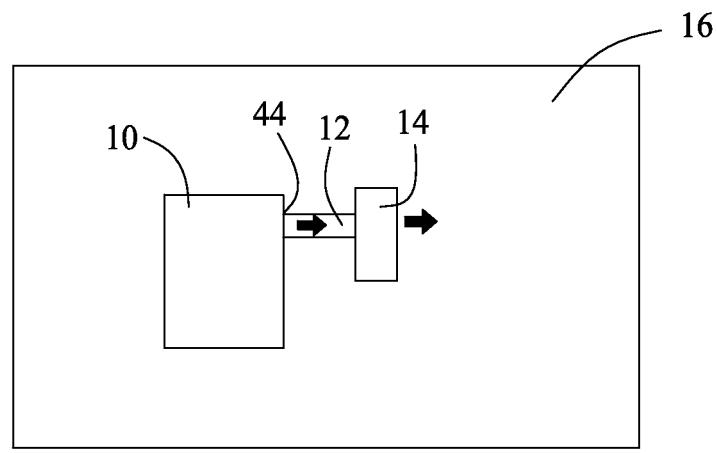
FIG. 1 is a schematic illustration of a nacelle including a debris-generating device having a filtering device.

FIG. 1 is a schematic illustration of a nacelle 16 including a debris-generating device 10 having an output 12 from a device outlet 44 of the debris-generating device 10, and a filtering device 14.

A slip ring is a technique of establishing an electrical connection through a rotating assembly. Slip rings, also known as rotary electrical interfaces, rotating electrical connectors, collectors, swivels or electrical rotary joints, are commonly found in electrical generators for AC systems and alternators and in packaging machinery, cable reels, and wind turbines.

A slip ring is a device comprising a conductive circle or band mounted on a shaft and is insulated from the shaft. Electrical connections from the rotating part of the system, such as the rotor of a generator, are established to the ring. Fixed contacts or brushes run in contact with the ring, transferring electrical power or signals to the exterior, static part of the system.

During operation of the slip-ring system 10, an amount of debris is released. The amount of released debris is contemplated to vary as a function of many parameters including rotational speed of the wind turbine, the pressure on the brushes, air moisture, temperature etc.

After the air has passed through the filter, it is contemplated that the amount of debris in the air has been greatly reduced. In an advantageous embodiment of the present invention, the amount of debris in the air after having passed through the filter 14 is reduced to 10% compared to the amount of debris in the air before passing through the filter. In an even more advantageous embodiment the debris is reduced to less than 10% after having passed through the filter 14. In an even more advantageous embodiment of the present invention the amount of debris is reduced to less than 2%, such as around 0% which corresponds to complete removal of debris.

Further advantageously, an air stream is established from or through the debris-generating device, in FIG. 1 shown as a box 10, through an outlet 12 to the electro-static filter 14. In an embodiment, the debris-generating device is a slip-ring device or assembly, e.g. connected to or forming a part of a generator in a wind turbine.

An existing wind turbine may be fitted with an electro-static filter as described above. However, as most nacelles of wind turbines have a limited interior space it is also possible to mount a filter in the way shown in FIG. 2.

Figure 7:
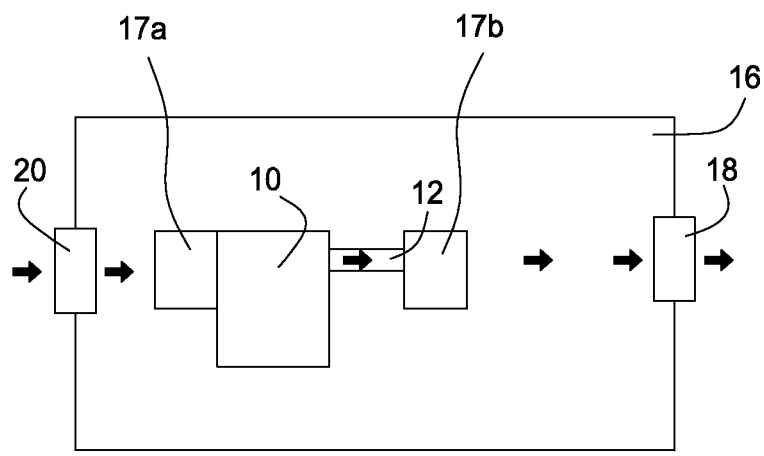
FIG. 7 is a schematic illustration of a nacelle including a debris-generating device, the nacelle having a filtering device at the inlet and outlet thereof.

As illustrated in FIG. 7, at least one flow generating device, e.g. at least a pump or at least a fan, or any combination thereof, may be used for establishing a flow of fluid, either air or liquid, past or through the debris-generating device. The flow generating device, e.g. the pump, may either push air or liquid through the debris-generating device as depicted by exemplary flow generating device 17A or suck air or liquid through the debris-generating device as depicted by exemplary flow generating device 17B.

Figure 2:
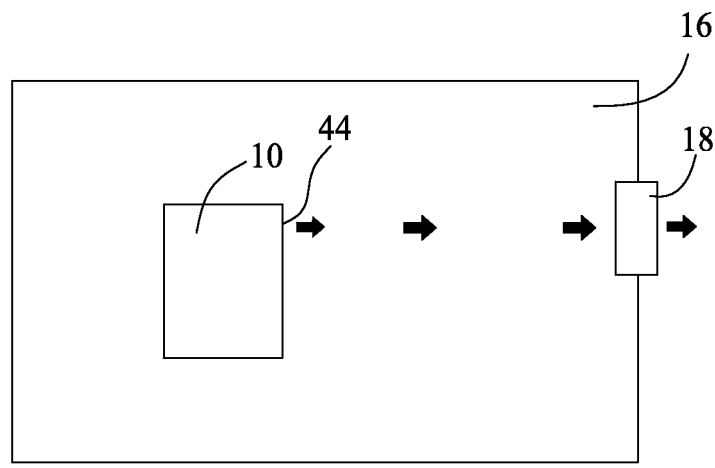
FIG. 2 is a schematic illustration of a nacelle including a debris-generating device, the nacelle having a filtering device at the outlet thereof.

FIG. 2 is a schematic illustration of a debris-generating device 10 in a nacelle 16 having a filtering device 18 at the outlet thereof. This configuration is contemplated to reduce the amount of debris released into the surroundings of a wind turbine. A configuration as shown in FIG. 2 is contemplated to be beneficial for environment around a wind turbine. If a wind turbine releases debris to the surroundings it may have a negative effect on the nature. The filtering device 18 is an electro-static filter.

The two embodiments illustrated in FIGS. 1 and 2 may be combined to an even more advantageous embodiment. The combination is illustrated in FIG. 3.

The wind turbine according to the present invention as described herein further provides the possibility to filter exhaust air from the nacelle. This is contemplated to reduce the amount of debris released into the surroundings of the wind turbine.

Figure 3:
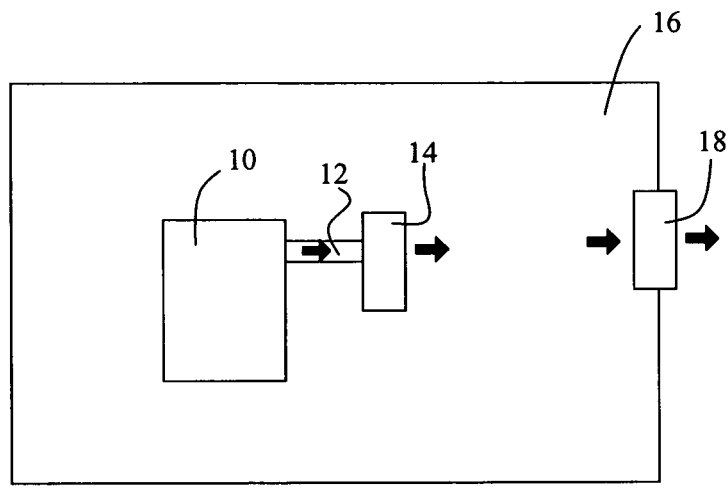
FIG. 3 is a schematic illustration of a nacelle including a debris-generating device having a filtering device and the nacelle having a filtering device at an inlet.

FIG. 3 is a schematic illustration of a debris-generating device 10 having an electro-static filtering device 14 in a nacelle 16 having another electro-static filtering device 18 at the outlet thereof. One of the filters 14, 18 may also be another kind of filter in another embodiment. The nacelle in FIG. 3 is contemplated to at least provide the advantage of reducing the amount of debris inside the nacelle 16 along with the amount of debris released into the surroundings. These advantages are contemplated to reduce need for service and repairs along with a lowered impact on the environment in which the wind turbine is located.

As wind turbines are sometimes located in debris-filled environments there may be a need for filtering the air coming into the nacelle 16. The air taken in from the surroundings is usually used for cooling.

Figure 4:
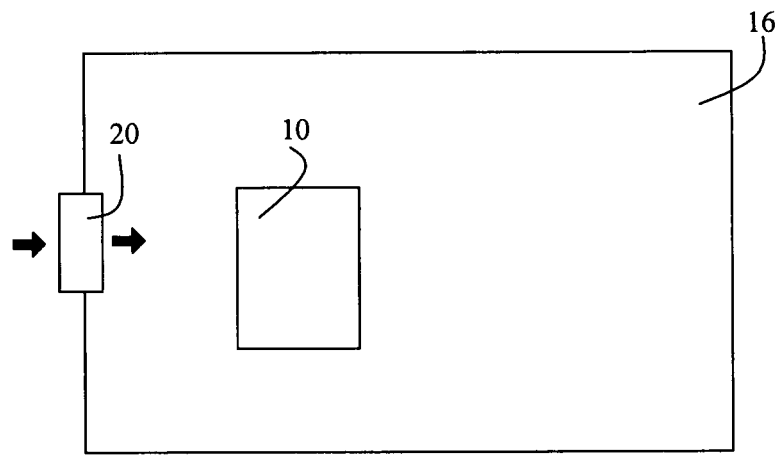
FIG. 4 is a schematic illustration of a nacelle including a debris-generating device, the nacelle having a filtering device at the inlet thereof.

FIG. 4 is a schematic illustration of a debris-generating device 10 in a nacelle 16 having a filtering device 20 at the inlet thereof. The filtering device 20 is an electro-static filter. The filter 20 is contemplated to remove or at least reduce the amount of debris or foreign particles flowing into the nacelle 16. Surprisingly the electro-static filter 20 is especially suitable for reducing debris or foreign particles in the outside air (external to the nacelle). e.g polluted air or salty air.

In salty environments the salt ions in the air may be deposited on cooling plates which may reduce the ability of a plate to transfer heat, i.e. to cool. This is highly undesirable as overheating may lead to break-down or damage of parts in the wind turbine.

Figure 5:
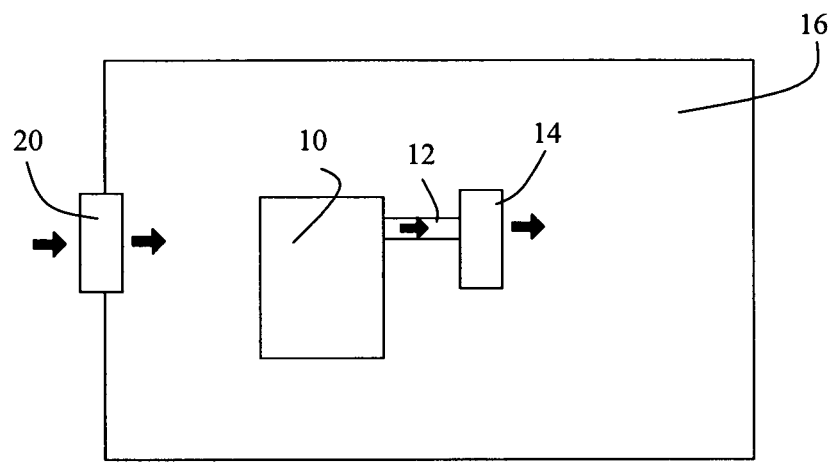
FIG. 5 is a schematic illustration of a nacelle including a debris-generating device having a filtering device, the nacelle having a filtering device at the inlet thereof.

FIG. 5 is a schematic illustration of a debris-generating device 10 having a filtering device 14 at the outlet 12 in a nacelle 16 having a filtering device 20 at the inlet thereof. This embodiment is surprisingly efficient for reduction of debris coming from the outside and at the same time debris generated inside the nacelle 16 by the debris-generating device 10.

Figure 6:
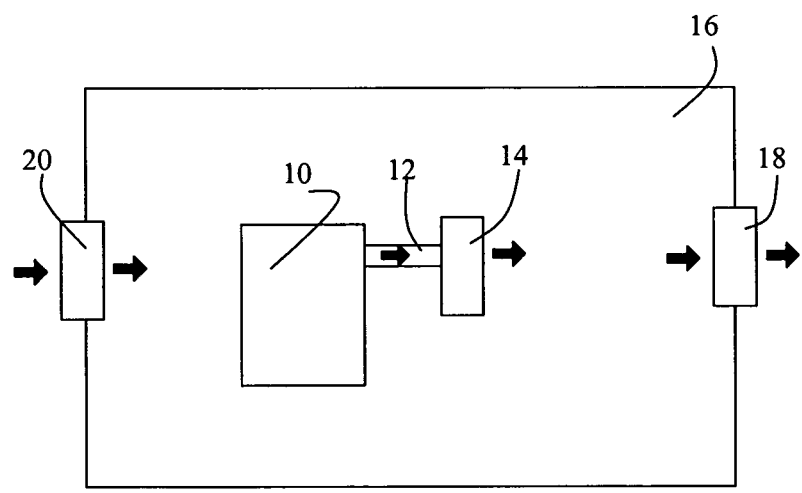
FIG. 6 is a schematic illustration of a nacelle including a debris-generating device having a filtering device, the nacelle having a filtering device at the inlet and outlet thereof.

FIG. 6 is a schematic illustration of a debris-generating device 10 having a filtering device 14 at the outlet 12 in a nacelle 16 having filtering devices 18, 20 at the inlet and outlet thereof. This is contemplated to greatly reduce need for repair and service due to built-up of debris on components inside the nacelle 16 and at the same time reduce the amount of debris released into surrounding environment.

FIG. 7 is a schematic illustration of a debris-generating device 10 in a nacelle 16 having filtering devices 18, 20 at the inlet and outlet thereof. This embodiment may advantageously be established on excising wind turbines as it is contemplated to reduce need for service and repair due to debris originating from the outside of the nacelle. Also the embodiment is contemplated to reduce the amount of debris released into the environment.

Figure 8:
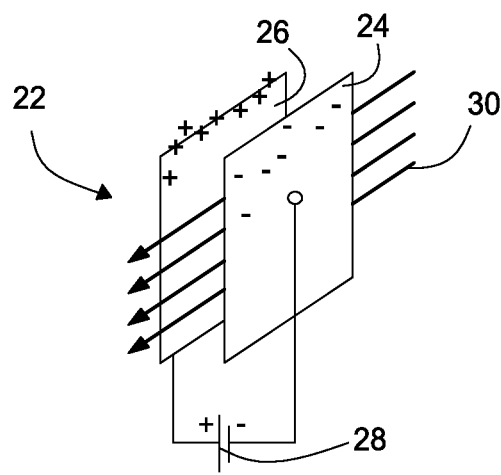
FIG. 8 is a schematic illustration of the principle in an electro-static filtering device.

FIG. 8 is a schematic illustration of the principle in an electro-static filtering device 22. The actual dimensions of the electro-static filter in a given embodiment may depend on the implementation and design choices performed by the person skilled in the art. The dimensions may depend on the air speed, the degree of cleaning desired, the average size of particles to be removed from the air etc.

The filtering device 22 comprises two metallic parallel plates 24 and 26. The plates 24, 26 are electrically connected to an electrical power source 28. The electrical power source 28 provides a voltage difference between the two plates 24, 26. In the embodiment shown in FIG. 8, the plate 24 is negatively charged and the plate 26 is positively charged. This difference in charge establishes an electro-magnetic field between the plates. Any particle traveling between the plates 24, 26 will pass through the electro-magnetic field. Particles susceptible to the electro-magnetic field will change path from the path illustrated by the lines at 30. The electrically charged particles will be deflected onto or towards one of the plates 24, 26 depending on the positively or negatively charged particle. This is contemplated to allow a portion of the particles to be stopped, i.e. filtered out of the air stream flowing along path 30. A part of the charged particles may then be collected and stored until next scheduled service or when repairs are needed.

By using electro-static filters, the debris can be collected and stored in a safe manor until the filters must be cleaned. When cleaning the filter, the debris can be contaminated in a controlled and safe manor and send to recycling or depositing.

Without the use of filters as described above, the brush/slip ring debris might simply be sucked out of the slip ring housing using e.g. a fan and blown out of the nacelle at the backend and into the environment or worse inside the nacelle.

In any of the embodiments described above the electro-static filter may either be a part of the slip ring housing, e.g. closed air circuit, and/or a part of the existing exhaust system at the rear end of the wind turbine.

Figure 9:
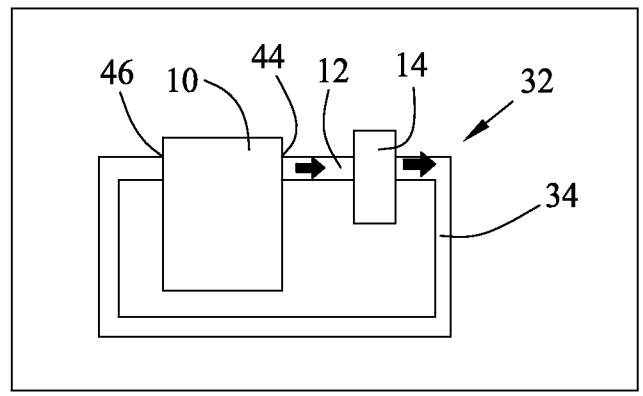
FIG. 9 is a schematic illustration of a closed-loop circuit.

FIG. 9 is a schematic illustration of a closed-loop circuit 32 in a nacelle 16. A debris-generating device 10 produces debris. The device 10 is cooled by a fluid. In a presently preferred embodiment the fluid is a liquid. In a further preferred embodiment the liquid is oil. The fluid is transported from a device outlet 44 the debris-generating device 10 via conduit 12 to filter 14. The filter 14 is as above preferably an electro-static filter. After passing through the filter 14 the fluid is transported back into the debris-generating device 10 via conduit 34 to a device inlet 46 of the debris-generating device 10.

Figure 10:
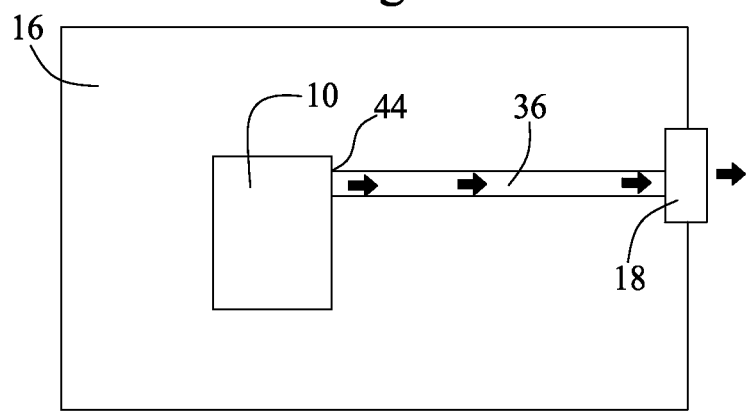
FIG. 10 is a schematic illustration of a system with a conduit illustrated.

FIG. 10 is a schematic illustration of a system with a conduit 36. The conduit 36 is contemplated to ensure that the interior of the nacelle 16 is not directly exposed to air having debris. The size of the conduit may be chosen or designed depending on other characteristics of the system, e.g. volume through-put etc.

Figure 11:
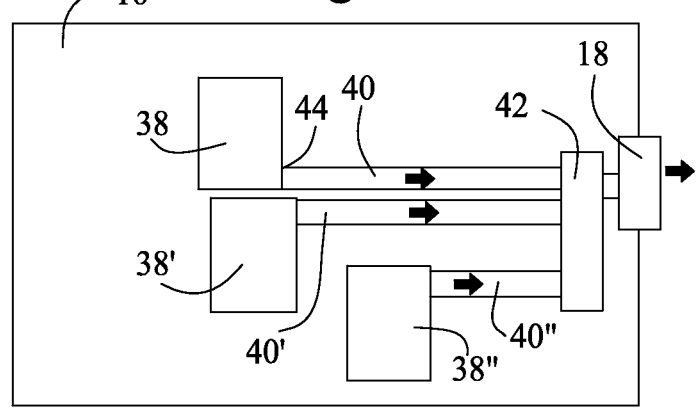
FIG. 11 is a schematic illustration of a system having three debris-generating devices.

FIG. 11 is a schematic illustration of a system having three debris-generating devices 38, 38' and 38". Each debris-generating device 38, 38' and 38" is connected via a corresponding conduit 40, 40' and 40" to a manifold 42. The manifold 42 allows a number of debris-generating devices, here illustrated as three devices, to be connected to a single filter device 18.

In the above like elements are given like numerals.

The invention claimed is:

1. A wind turbine, comprising:
    a nacelle including a nacelle inlet for air and a nacelle outlet for the air;
    at least one debris-generating device mounted in the nacelle and generating a first amount of debris, wherein the at least one debris-generating device includes a device outlet for discharging a fluid stream and the first amount of the debris entrained therein, wherein the fluid stream includes at least a portion of the air coming in the nacelle inlet; and
    an electro-static filtering device comprising at least one electro-static filter configured to receive the fluid stream departing from the device outlet of the at least one debris-generating device, the electro-static filtering device includes a filtering device inlet and a filtering device outlet, the electro-static filtering device further being configured to filter the fluid stream which is received leaving only a second amount of the debris provided by the at least one debris-generating device within the fluid stream, wherein the second amount of debris being lower than the first amount of debris;
    at least one fluid path conduit comprising at least one of piping or tubing, wherein the at least one fluid path conduit establishes a fluid path from the device outlet of the at least one debris-generating device to the filtering device inlet and from the filtering device outlet to the nacelle outlet.

2. The wind turbine of claim 1, wherein the second amount of debris is less than a tenth of the first amount of debris.

3. The wind turbine of claim 1, further comprising
    at least one second electro-static filter arranged to filter outside debris received by the nacelle inlet.

4. The wind turbine according to claim 1, wherein the first amount of debris provided by the at least one debris-generating device comprises a silver-graphite mixture, and originates from moving parts of the at least one debris-generating device.

5. The wind turbine of claim 1, further comprising a flow generating device to establish the fluid stream.

6. The wind turbine of claim 5, wherein the flow generating device is a fan or pump.

7. A method, comprising:
    flowing air into a nacelle through a nacelle inlet and flowing the air out of the nacelle through a nacelle outlet;
    generating a first amount of debris with at least one debris-generating device mounted in the nacelle,
    discharging a fluid stream and a first amount of the debris entrained therein from a device outlet of the at least one debris-generating device, wherein the fluid stream includes at least a portion of the air coming in the nacelle inlet;
    receiving the fluid stream from the device outlet of the at least one debris-generating device at a filtering device inlet of an electro-static filtering device, the electro-static filtering device comprising at least one electro-static filter;
    filtering, with the electro-static filtering device, the fluid stream from the at least one debris-generating device and leaving only a second amount of the debris provided by the at least one debris-generating device within the fluid stream which is discharged through a filtering device outlet of the electro-static filtering device, wherein the second amount of debris being lower than the first amount of debris, and
    establishing, with at least one fluid path conduit comprising at least one of piping or tubing, a fluid path from the device outlet of the at least one debris-generating device to the filtering device inlet and from the filtering device outlet to the nacelle outlet.

8. The method of claim 7, wherein the establishing the air stream includes the use of a flow generating device.

9. The method of claim 8, wherein the flow generating device is a fan or pump.

10. The method of claim 7, wherein the second amount of debris is less than a tenth of the first amount of debris.

11. The method of claim 7, further comprising filtering, with at least one second electro-static filter, outside debris arriving into the nacelle through the nacelle inlet.

* * * * *